United States Patent [19]

Köhler et al.

[11] Patent Number: 5,126,429
[45] Date of Patent: Jun. 30, 1992

[54] FLEXIBLE POLYAMIDE FROM DIMER ACID AND BIS-SECONDARY DIAMINE

[75] Inventors: Burkhard Köhler; Hans-Detlef Heinz; Heinrich Schrage, all of Krefeld, Fed. Rep. of Germany

[73] Assignee: Bayer Aktiengesellschaft, Leverkusen-Bayerwerk, Fed. Rep. of Germany

[21] Appl. No.: 656,594

[22] Filed: Feb. 19, 1991

[30] Foreign Application Priority Data

Feb. 28, 1990 [DE] Fed. Rep. of Germany ....... 4006245

[51] Int. Cl.⁵ .............................................. C08G 69/34
[52] U.S. Cl. .................................... 528/335; 528/324; 528/327; 528/338; 528/339.3; 528/340; 528/341; 528/345

[58] Field of Search .................... 528/335, 339.3, 338, 528/340, 341, 324, 327, 345

[56] References Cited

U.S. PATENT DOCUMENTS 4,810,772  3/1989  Leoni et al. ...................... 528/339.3

Primary Examiner—Harold D. Anderson
Attorney, Agent, or Firm—Connolly and Hutz

[57] ABSTRACT

This invention relates to amorphous, flexible elastomeric polyamides based on dimer fatty acids and special disecondary diamines which have a glass transition temperature below 10° C., to the production of these elastomeric polyamides and to their use as rubbers, plasticizers and, in particular, high-impact modifiers for thermoplastics or as flexible segments for the synthesis of thermoplastic elastomers and as additives for other purposes.

3 Claims, No Drawings

FLEXIBLE POLYAMIDE FROM DIMER ACID AND BIS-SECONDARY DIAMINE

This invention relates to amorphous, flexible elastomeric polyamides based on dimer fatty acids and special disecondary diamines which have a glass transition temperature below 10° C., to the production of these elastomeric polyamides and to their use as rubbers, plasticizers and, in particular, high-impact modifiers for thermoplastics or as flexible segments for the synthesis of thermoplastic elastomers and as additives for other purposes.

Flexible segments for the synthesis of thermoplastic elastomers are known and include, for example, polyethers and aliphatic polyesters. Polyethers for example often show poor weathering resistance while polyesters are vulnerable to hydrolysis. In addition, the fact that both are generally terminated by hydroxyl groups often results in poor reactivity of the terminal groups or, in the case of polyurethanes for example, in relatively poor thermal stability of the connecting group.

It would therefore be desirable to be able to use elastomers or rather flexible segments based on polyamides because the amide group is distinctly more stable to hydrolysis than the ester group because the synthesis of polyamides allows considerable freedom in regard to the terminal groups and because the N-alkyl polyamides formed or rather the terminal secondary amino groups show relatively low reactivity.

In addition, flexible polyether and polyester segments show relatively poor thermal stability so that they cannot be used to elasticize high-performance thermoplastics. Accordingly, thermally stable flexible polyamide segments of relatively low reactivity are of considerable interest.

It has now surprisingly been found that polyamides based on dimeric fatty acids and special cyclic bisecondary diamines are amorphous, have glass transition temperatures below +10° C., readily available structural units being suitable for use, and are eminently suitable as elasticizers/impact modifiers for thermoplastics. Accordingly, the present invention relates to amorphous, flexible polyamides which have a glass transition temperature Tg below +10° C. and preferably below 0° C. and show elastomeric behavior, consisting of units derived from 1) dimer fatty acids (polymeric fatty acids) containing at least 80% by weight and preferably at least 90% by weight dimeric fatty acids,
2) bis-secondary diamines corresponding to formula (I)

in which
R$^1$ and R$^2$ may be the same or different and represent C$_{1-22}$ alkyl or alkenyl radicals, preferably C$_{2-4}$ alkyl radicals, more preferably butyl radicals, and
R$_3$ is a C$_{2-44}$ alkylene radical, preferably a C$_{3-5}$ alkylene radical which is preferably saturated, but may even contain double bonds,
and, optionally,
3) 0 to 60% by weight and preferably 0 to 50% by weight other known polyamide-forming structural units, preferably caprolactam, adipic acid, hexamethylenediamine, piperazine, 1-aminoethyl piperazine, lauric lactam, aminoundecanoic acid, azelaic acid, sebacic acid and suberic acid, the dicarboxylic acids 1) and optionally 3) and the diamines 2) and optionally 3) being used in a molar ratio of 8 to 0.8:1 and preferably 1:0.9 to 0.9:1.

The present invention also relates to a process for the production of the polyamides according to the invention from the components mentioned by standard polycondensation methods known per se.

Suitable disecondary diamines are N,N'-dibutyl hexamethylenediamine, N,N'-dimethyl hexamethylenediamine, N,N'-dihexyl hexamethylenediamine, 1,12-dibutylaminododecane, 1,10-dibutylaminodecane, N,N'-didodecyl hexamethylenediamine, N,N'-dibutyl butylenediamine, N,N'-dibutyl ethylenediamine, N,N'-diisobutyl butylenediamine.

The disecondary diamines are known, for example N,N'-dibutyl-1,4-butylenediamine (Chemical Abstracts, Registry No. 19435-69-9) or N,N'-dibutyl hexamethylenediamine (Chemical Abstracts, Registry No. 4835-11-4).

N,N'-di-n-butyl butylenediamine, N,N'-di-n-butyl hexamethylenediamine are preferred.

Dimer fatty acids are known and are commercially available (for example from Unichema or Henkel). Preferred dimer fatty acids are those marketed inter alia by Unichema under the tradename of Pripol ®. The dimer fatty acids may also contain up to 5% by weight and preferably up to 3% by weight more highly polymerized derivatives (trimeric fatty acids) and optionally small amounts of monomeric fatty acids or unsaturated components of the type often present in industrial products.

Components 1) and 3) may even partly contain double bonds.

Typical chain terminators may be used in typical quantities in the production of the polyamides and include, for example, monofunctional carboxylic acids or amines, for example acetic acid, hexanoic acid, benzoic acid, cyclohexane carboxylic acid, stearic acid, hexylamine and cyclohexylamine.

Anhydrides such as, for example, maleic anhydride or tetrahydrophthalic anhydride are also suitable as comonomers.

The polyamides according to the invention are produced by standard methods.

The catalysts typically used in the production of the polyamides may be used.

The elastomeric polyamides according to the invention are amorphous. In the context of the present invention, this means that the heat of fusion at the melting point, as determined by thermoanalysis (DSC), for example at a heating rate of 20 K/s (second heating), should be at most 2 J/g, preferably no more than 1 J/g and, more preferably, no more than 0.5 J/g.

In addition they have glass temperatures, as determined for example by DSC, below 10° C., preferably below 0° C. and, more preferably, below −15° C.

The polyamides according to the invention are preferably terminated by reactive groups which may be predominantly carboxyl or predominantly (secondary) amino groups, depending on the excess of the dicarboxylic acid or (secondary) diamine components during their production. The polyamides according to the invention show very high thermal stability (under nitrogen, for example up to 370° C., see Examples).

Accordingly, the polyamides according to the invention may be used as flexible segments for polycondensates, such as polyamides or polyesters for example, and/or polyadducts, such as polyurethanes for example. They may also be used in particular as impact modifiers or plasticizers for thermoplastics and thermoset materials. In addition, the polyamides according to the invention may be used as an elastomer segment, as catalysts for thermoset materials, for example epoxy-based thermoset materials, or even (after crosslinking) as rubbers. They are also suitable as additives for thermoplastics, thermoset materials and fibers.

EXAMPLES

Example 1

57 g dimeric fatty acid (acid value 194.5) (Pripol ®1010), 20 g N,N'-dibutyl-1,4-butylenediamine and 0.1 g triphenyl phosphite are heated under nitrogen for 1 hour at 180° C. and for 5 hours at 270° C. Glass transition temperature (DSC) $Tg = -36°$ C.

Example 2

57 g dimer fatty acid (acid value 194.5), 22.8 g N,N'-dibutyl-hexamethylenediamine and 0.1 g triphenyl phosphite are heated under nitrogen for 1 hour at 80° C. and for 5 hours at 270° C. Glass transition temperature (DSC) $Tg = -48°$ C.

With both polyamides, the minimum of the first derivative of the thermogravimetric measurement (temperature of maximum decomposition) is at 450° C. The polyamides are stable under nitrogen up to 370° C.

We claim:

1. Amorphous, flexible polyamide having a glass transition temperature Tg below +10° C. and elastomeric behavior, consisting of amide units derived from
   A) dimer fatty acid containing at least 80% by weight dimeric fatty acid, and
   B) bis-secondary diamine corresponding to formula

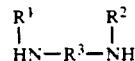

in which
   $R^1$ and $R^2$ are each the same or different and each represents $C_{1-22}$ alkyl or alkenyl radicals and
   $R^3$ is a $C_{2-44}$ alkyl or alkylene radical,
   wherein the molar ratio of dicarboxylic acid to the diamine is 1:0.8 to 0.8:1.

2. Amorphous polyamide as claimed in claim 1 wherein for the bis-secondary diamine $R^1$ and $R^2$ are $C_{2-4}$ alkyl or alkenyl radicals and $R^3$ is a $C_{3-6}$ alkylene radical.

3. Amorphous polyamide as claimed in claim 1 wherein the bis-secondary diamine is an N,N'-di-n-butyl tetramethylenediamine or N,N'-di-n-butyl hexamethylenediamine.

* * * * *